United States Patent
Karn et al.

(10) Patent No.: US 7,659,999 B2
(45) Date of Patent: Feb. 9, 2010

(54) UIDESIGN: N-UP CALCULATOR USER INTERFACE

(75) Inventors: Keith Stoll Karn, Avon, NY (US); Marc J. Krolczyk, Spencerport, NY (US); Thomas J. Perry, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 762 days.

(21) Appl. No.: 11/315,217

(22) Filed: Dec. 23, 2005

(65) Prior Publication Data

US 2007/0146743 A1 Jun. 28, 2007

(51) Int. Cl.
*G06F 15/00* (2006.01)
*H04N 1/387* (2006.01)

(52) U.S. Cl. ............... 358/1.12; 358/1.2; 358/1.13; 358/1.18; 358/1.9; 358/450; 358/451; 715/274; 715/277

(58) Field of Classification Search ....... 358/1.11–1.16, 358/1.2, 1.9, 450, 451; 715/274, 277
See application file for complete search history.

(56) References Cited

U.S. PATENT DOCUMENTS

| | | | | |
|---|---|---|---|---|
| 6,765,691 | B2 * | 7/2004 | Kubo et al. | 358/1.9 |
| 6,958,820 | B1 * | 10/2005 | Takenaka et al. | 358/1.12 |
| 7,124,359 | B2 * | 10/2006 | Suzuki et al. | 715/202 |

* cited by examiner

*Primary Examiner*—Chan S Park
(74) *Attorney, Agent, or Firm*—Ronald E. Prass, Jr.; Prass LLP

(57) ABSTRACT

A N-up calculator graphical user interface (GUI) is provided for performing N-Up printing. The graphical user interface includes configurable objects for specifying: 1) the size of the page, 2) the dimensions of the image, and 3) the number of images to be printed on each page (N-up). The controls on the GUI can include page size, reduction/enlargement percentage, final image size–height/width, Number up, and other related controls. The manipulation of any one of the controls may affect the others according to a set of rules. These rules determine which objects are held constant and for which values are automatically calculated, and the object automatically configured. The rule-set can be manipulated by selecting from a list of modes or options such as "Conserve Paper," "Fit as Many Images as Possible" or "Maximize Image size" or by locking certain controls and freeing others.

24 Claims, 4 Drawing Sheets

UIDESIGN: N-UP CALCULATOR USER INTERFACE

BACKGROUND

1. Field of the Technology

The present disclosure relates to a method, system and computer program product for configuring printing and copying systems. More particularly, the present disclosure relates to a method, system and computer program product for performing N-Up printing (also known as "multiple-up printing").

2. Description of the Prior Art

Graphical User Interfaces ("GUIs") are used to display and configure parameter values for document processing, such as "N-up printing." N-up printing involves printing more than one image on a page. This may include: 1) printing an image at a specific size, and fitting as many copies of this image on a page as possible; 2) printing an image at a specific reduction/enlargement value (e.g., 50%) and fitting as many copies of the image on the page as possible; or 3) printing a specific number of images on each page while keeping the resulting image as large as possible.

Typically, a GUI only provides controls to perform one of these types of N-up printing. The selection of a value for the control will cause the system to automatically perform the calculations necessary to perform the type of N-Up printing that the control is provided to support in accordance with the selected value. For example, the selection of a size value for the image size control will result in the system automatically calculating the number of images that can fit on each page at the selected size value. Likewise, the selection of a value for the Number up control (specifying the number of images per page) will result in the system automatically calculating the maximum image size to provide the selected value of images on each page.

When controls for a type of N-up printing are not provided, the user must manually perform the mathematical calculations to perform the N-Up printing. For example, a user has an original image and needs to reduce the final image to a specific size, printing images 2 per page, but a control for the final image size is not provided in the GUI. So, the user must compute the reduction percentage by manually by dividing the final image size by the original image size and then the user must enter this computed reduction percentage in the GUI in order to obtain the desired output. Alternatively, the user can employ trial and error to obtain the desired output. In addition, the available GUIs for N-up printing often fail to provide the user with adequate feedback related to the output that will result based on the mathematical calculation. As a result, a substantial amount of time and resources are wasted because of the trail an error that must be preformed to obtain the desired output from the performance of N-up printing.

Accordingly, there is a need for a method, system and computer program product for performing N-up printing. There is a need for the method, system and computer program product to support each of the different types of N-up printing within a single system. There is a need for the method, system and computer program product to perform the necessary calculations to perform each type of N-up printing. There is a need for the method, system and computer program product to provide feedback.

SUMMARY OF DISCLOSURE

According to embodiments of the present disclosure, a method, system and a computer program product for performing N-up printing are provided. A GUI is provided having controls to perform various types of N-up printing. The selection of a N-up printing control initiates the calculations required to perform the N-up printing in accordance with the value configured for the N-up printing control. The GUI provides feedback in accordance with the values selected for N-up printing controls. The GUI substantially reduces the amount of time and resources wasted and the trial and error that may be preformed to obtain the desired output from the performance of N-up printing.

BRIEF DESCRIPTION OF THE DRAWINGS

The above described features and advantages of the present disclosure will be more fully appreciated with reference to the detailed description and appended figures in which.

DETAILED DESCRIPTION OF DISCLOSURE

The subject matter of the present disclosure is now described more fully hereinafter with reference to the accompanying drawings that show exemplary embodiments of the present technology. The subject matter of the present disclosure, however, may be embodied in many different forms and should not be construed as limited to the embodiments set forth herein. Appropriately, these embodiments are provided so that this disclosure will be thorough and complete, and will fully convey the scope of the disclosed subject matter.

According to embodiments of the present disclosure, a method, system and a computer program product for performing N-up printing are provided. A GUI is provided having controls to perform various types of N-up printing. The selection of a N-up printing control initiates the calculations required to perform the N-up printing in accordance with the values configured for the N-up printing controls. The GUI provides feedback in accordance with the values selected for N-up printing controls. The GUI substantially reduces the amount of time and resources wasted and the trial and error that may be preformed to obtain the desired output from the performance of N-up printing.

Figure 1:
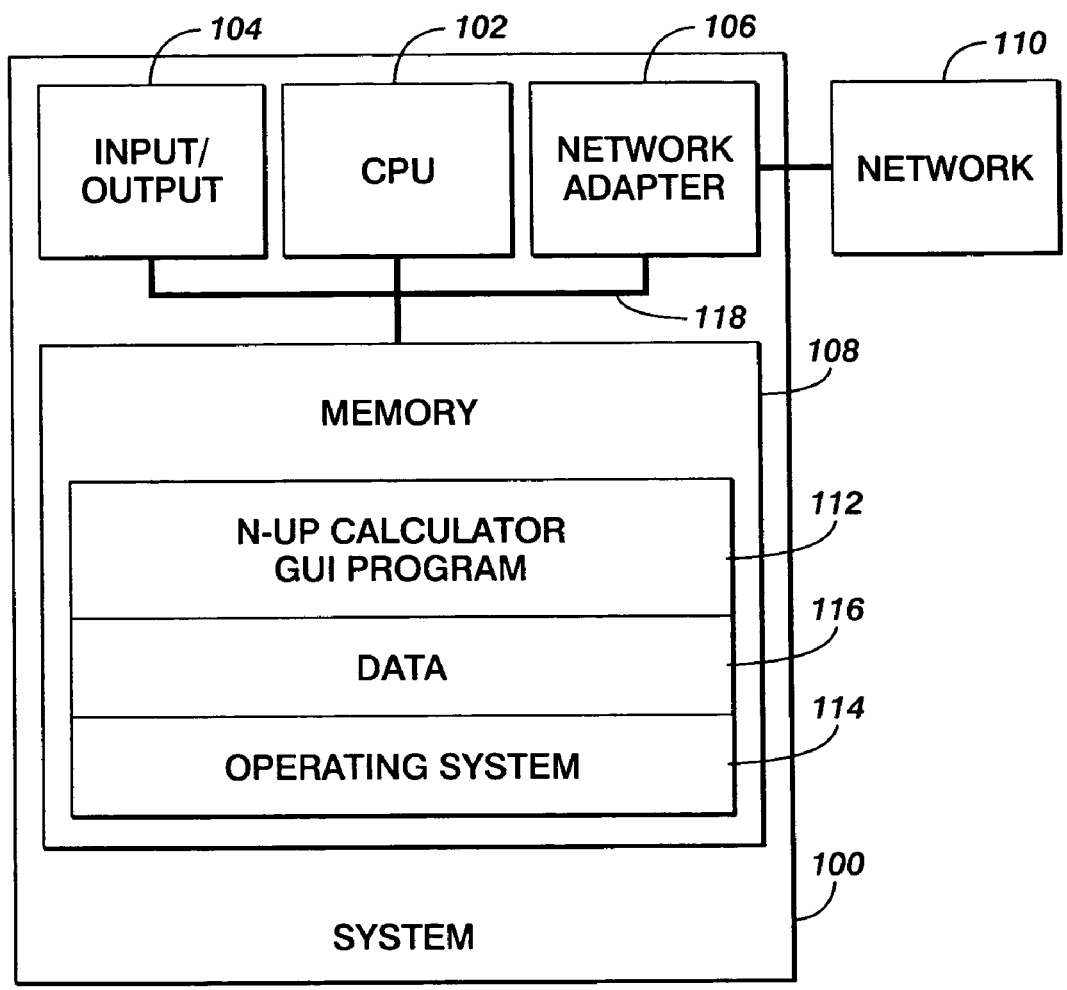
FIG. 1 depicts an exemplary functional block diagram of a device in which the present technology can find application.

FIG. 1 is an exemplary block diagram of a system 100 in which the present technology may be implemented. System 100 can be any one or a combination of a copier, printer, scanner and other reproduction system. The user system 100 may include CPU 102, connected by a bus 118 or other suitable interface means to system memory 108. In the FIG. 1 embodiment of the present disclosure, CPU 102 is a microprocessor, such as an INTEL PENTIUM® or AMD® processor, but may be any processor that executes program instructions in order to carry out the functions disclosed herein. The network adapter 106 provides an interface between the system 100 and a network 110, such as the Internet.

The user system 100 can also include input/output circuitry 104 and network adapter 106. Input/output device circuitry 104 enables interaction with and execution of instructions by user system 100 as directed by a user and output in response to executed instructions. The input/output circuitry 104 provides a GUI having controls to perform various types of N-up printing in accordance with the techniques disclosed by the present disclosure. The selection of a N-up printing control initiates the performance of calculations to perform N-up printing in accordance with the value configured for the N-up printing control. The GUI provides feedback in accordance with the N-up printing controls and the values selected for the control. The input/output circuitry 104 includes input devices, such as trackballs, mice, touch screens, touch pads and keyboards, and output devices, such as printers and monitors.

In an embodiment of the present technology, output devices include one or more controllers for regulating the application of inks or toners to paper for the generation of documents as well as the control of papers moving through output devices for proper registration in multi-channel color printing and the like. Output devices can include one or more discharge areas where finished documents are deposited by output devices for retrieval.

As shown in FIG. 1, the various components of the user system 100 communicate through a bus or similar architecture 118. Accordingly, systems memory 108 is disposed in communication with CPU 102 through bus 118. Systems memory 108 includes N-up calculator GUI program 112, operating system 114 and data 116. Operating system 114 provides overall system functionality. The GUI program 112 provides the functionality to perform N-up printing in accordance with the present technology. In the FIG. 1 embodiment of the present technology, N-printing includes, but is not limited to, printing an image at a specific size, and fitting as many copies of these image on a page as possible, printing an image at a specific reduction/enlargement value, such as 50%, and fitting as many copies of the image on the page as possible having the specific reduction/enlargement value, and printing a specific number of images on each page while keeping the resulting image as large as possible. In an embodiment of the present technology, N-up calculator GUI program 112 is a stand-alone application. In an embodiment of the present technology, N-up calculator GUI program 112 is an applet with a print dialogue. In an embodiment of the present technology, N-up calculator GUI program 112 is embedded in a system controller of system 100. In an embodiment of the present technology, GUI program 112 can be written in computer programming languages, such as C, JavaScript, a document description language such as Postscript, or the like.

Figure 2:
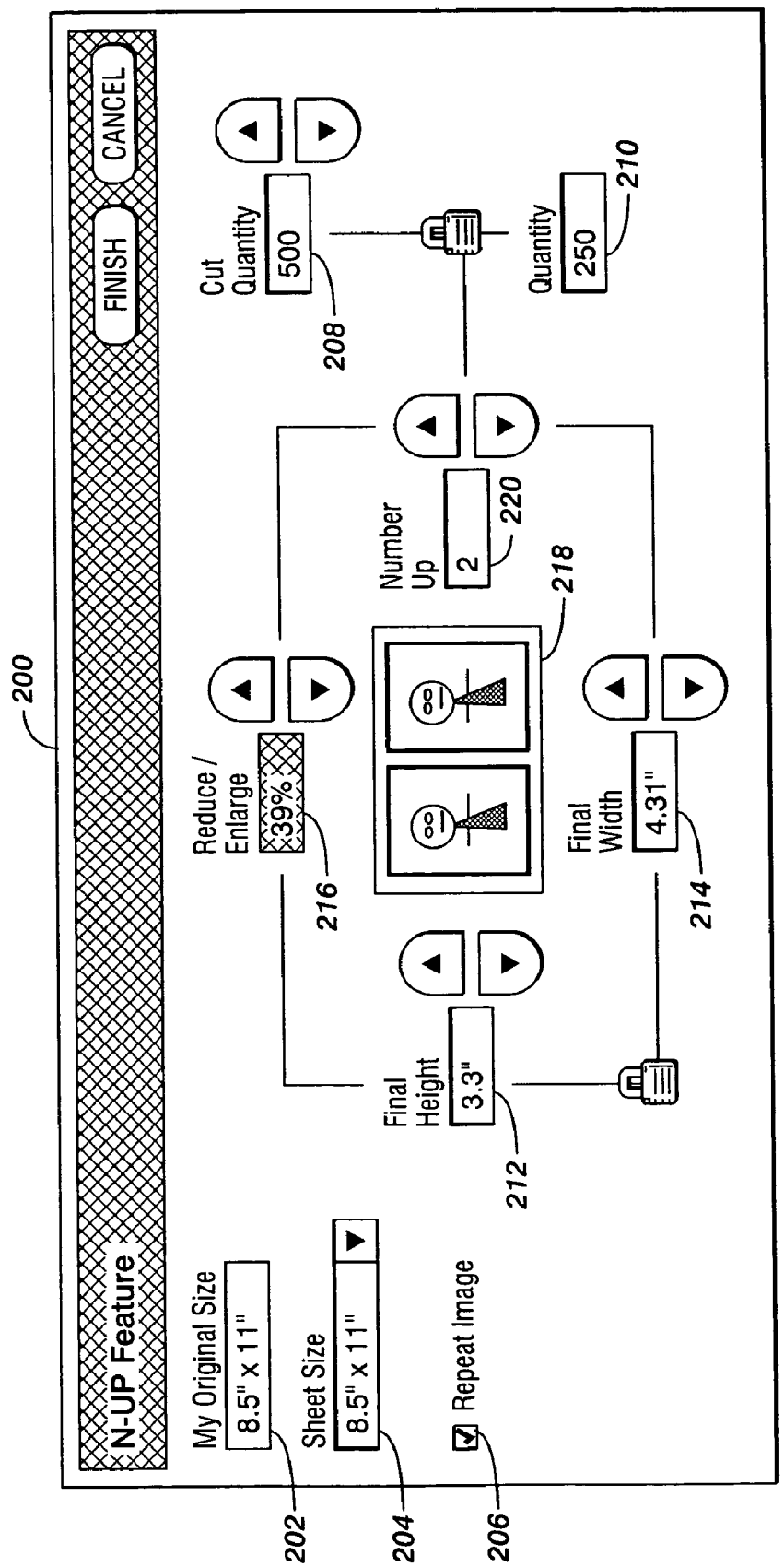
FIG. 2 depicts an exemplary diagram of a GUI in accordance with the present disclosure.

FIG. 2 depicts an exemplary GUI for performing N-up printing in accordance with the present disclosure. In the FIG. 2 embodiment of the present disclosure, the N-up printing controls of the GUI 200 include, but are not limited to, original size 202, sheet size 204, repeat image 206, cut quantity 208, quantity 210, Final height 212, Final width 214, reduce/enlarge 216, feedback screen 218, and N-up 220. Examples of additional controls include, but are not limited to, those for controlling parameters such as edge erase, margins, image shift, gutters, positioning of images within cells, and anamorphic scaling (independent scaling in two dimensions). Like the controls shown on the GUI 200, each of these additional controls could have a set of rules that determine which of the other N-up printing controls are held constant and which are computed when the user changes the control parameter. Each of the controls can be an object provided on a user interface that is configured to perform the function associated with the controls. The original size control 202 specifies the original size of an image to be processed. In an embodiment of the present technology, the original size control 202 is grayed out signifying that the control is not available for user configuration.

The sheet size control 204 can be configured to specify the size of a page on which to process an image. In the FIG. 2 embodiment of the present technology, the sheet size control 204 is configured to process an image on an 8.5 inch×11 inch size page. The sheet size control 204 can be configured to include standard paper sizes, such as 8.5 inch×11 inch, 11 inch×14 inch, 11 inch×17 inch, A3, A4, A5, and A6, as well as custom sizes. In the FIG. 2 embodiment of the present technology, the Number Up control 220 can be configured to specify the number of times, N, an image will be duplicated on the page having the size specified by sheet size control 204.

Each N-up printing control of GUI 200 has a set of rules that determine which of the other N-up printing controls of GUI 200 are held constant and which are computed when the user changes the control parameter. For example, in an embodiment of the present technology, the Number Up control 220, used to specify the number of images duplicated on a page, has priority over the original size 202, wherein the height and width of the image required to obtain the number of images specified by the Number up control is calculated and the Final Height 212 and Final Width 214 controls are automatically configured with calculated height and width values. Furthermore the system could provide user-selectable modes such as "Conserve Paper" or "Maximize Image size" in order to change the priorities of various N-up printing controls of GUI 200. The system could also provide user-selectable locks to lock certain attributes and free-others.

The cut quantity control 208 is made available for configuration when the repeat image control 206 is selected. Cut quantity control 208 can be configured to specify the total number of times an image is to be duplicated. In the FIG. 2 example of the present technology, the cut quantity control is configured to 500, which means that a total of 500 images will be output. The cut quantity control 208 parameter is associated with the repeat image control 206, Number Up control 220, and quantity control 210. In an embodiment of the present technology, the values configured for the cut quantity control 208 and Number up control 220 determine the value automatically configured for the quantity control 210. For example, in the FIG. 2 embodiment of the present invention, the value for Number up control is configured to 2 and the value configured for the cut quantity is 500, which means that each page is to be provided with 2 images at a time and a total of 500 images are to be output. The present technology automatically calculates that 250 sheets will be printed and automatically configures the quantity control 210 with the calculated value to specify the number of sheets that will be printed. In an embodiment of the present technology, the quantity control 210 can be manually configured when the repeat image control 206 is selected to specify the quantity of printed pages. The values configured for the quantity control 210 and Number up control 220 determine the value automatically configured for the cut quantity 208. For example, in the FIG. 2 embodiment of the present invention, the value for Number up control is configured to 2 and the value configured for the quantity is 250, which means that a page is to be provided with 2 images at a time and a total of 250 pages are to be output. The present technology automatically calculates that 500 page images will be printed and automatically configures the cut quantity 208 with the calculated value to specify the total number of page images that will be printed. When the Repeat Image control 206 is on, the same image is replicated on a single page. When the repeat image control 206 is off, a series of different images are put on a page.

In the FIG. 2 embodiment of the present technology, Final height control 212 and Final width control 214 can be configured to output an image having a desired height and width. In an embodiment of the present technology, the configuration of the Final height control 212 and/or the Final width control 214 modifies the value configured for Number up control 220 by automatically calculating the number of images that can be reproduced on a page in accordance with the values configured for the Final height control 212 and the Final width control 214. In the FIG. 2 embodiment of the present technology, the lock symbol on the line connecting Final height control 212 and Final width control 214 indicates that the height/width aspect ratio of the image is held constant. Alternatively the system could allow independent adjustment of final image height and width (known as anamorphic scaling).

In the FIG. 2 embodiment of the present technology, reduce/enlarge control 216 can be configured to output an image having a size that is larger (i.e., >100%) or smaller (i.e., <100%) than the original image. In an embodiment of the present technology, the configuration of the reduce/enlarge control 216 modifies the values configured for Final height control 212 and/or the Final width control 214 by automatically calculating the height and width values that correspond to the degree of enlargement of reduction specified by the reduce/enlarge control 216. In the FIG. 2 embodiment of the present technology, a feedback screen is provided to allow users to see a visual representation of how changes to a control impact the number, orientation and arrangement of images that will be duplicated on a page. In an embodiment of the present technology, the visual feedback is in the form of graphical representations of a page with the specified number of page images. This graphical representation could include miniaturized "thumbnail" images of the actual page images to be output.

Figure 3:
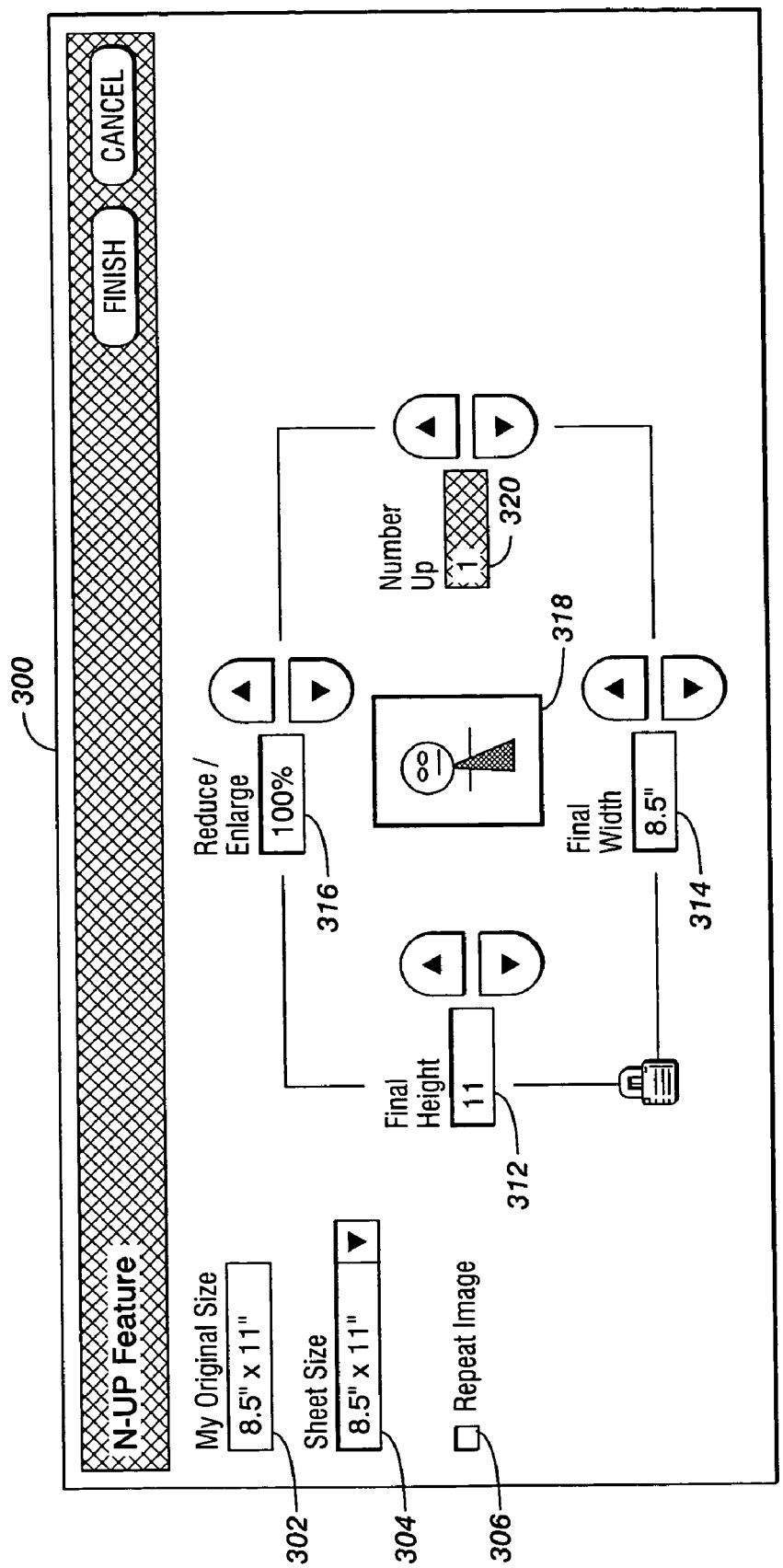
FIGS. 3 and 4 depict exemplary GUIs illustrating the operation of N-Up printing.
Figure 4:
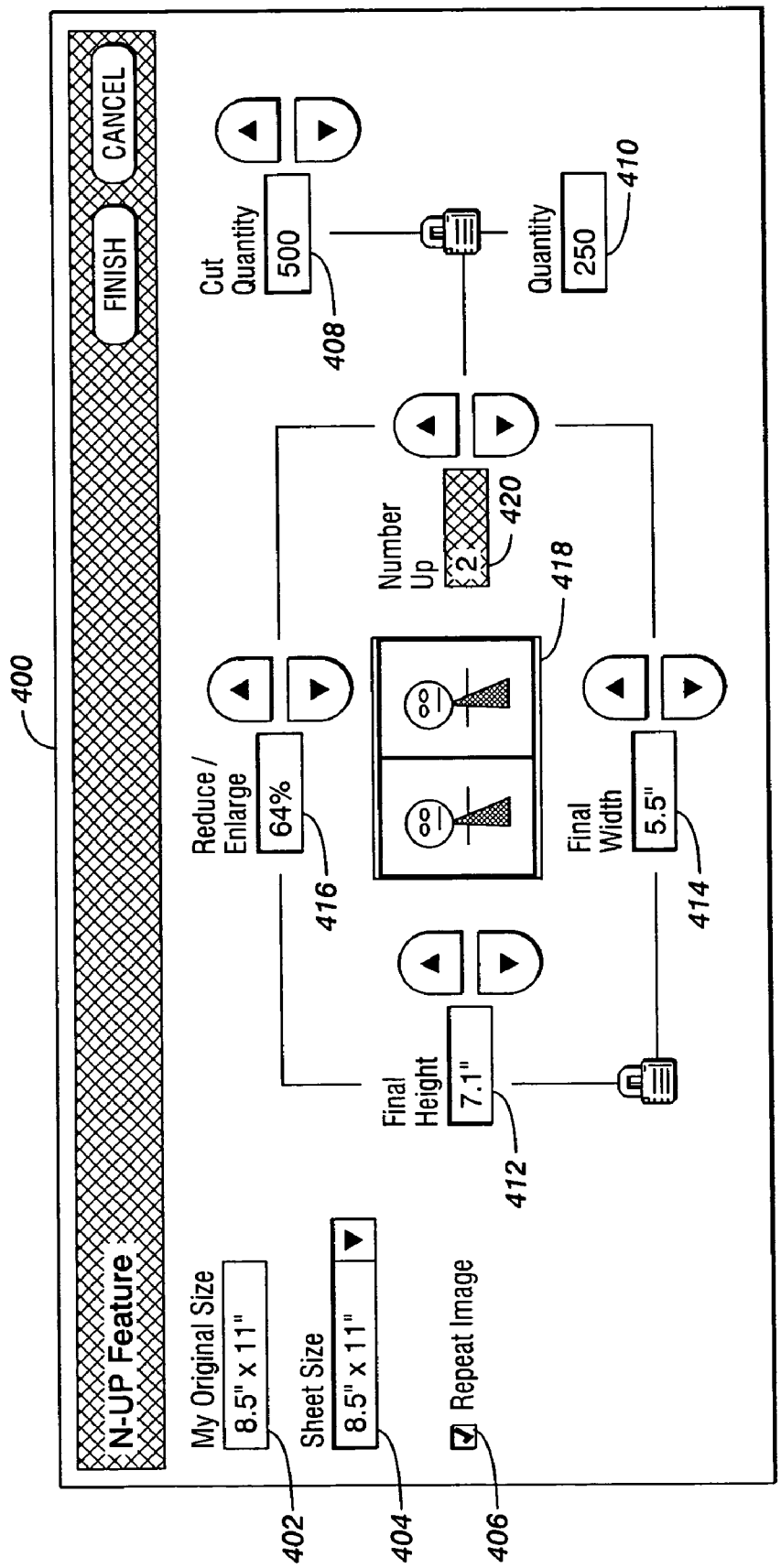

FIGS. 3 and 4 depict an exemplary GUI illustrating the operation of N-Up printing. In the FIG. 3 embodiment of the present invention, the N-up GUI 300 is configured to provide an image in its original form on each page. The Number up control 320 is configured to 1 image per sheet, and the height control 312, width control 314 and reduce/enlarge control 316 are configured at their default values. One image will be provided on a sheet as shown in the preview screen 318. In the FIG. 4 embodiment of the present invention, the N-up GUI 400 is configured to provide 2 of the original images on each page. The Number up control 420 is configured to 2 and the repeat image control 406 is selected. In response to the selection of the repeat image control 406 the cut quantity and quantity controls are displayed. In response to the configuration of the Number up control 420 to the value 2, the values required for the height, width and reduce/enlarge controls to provide 2 of the images on a sheet of the size specified are automatically calculated. Two images will be provided on each page, rotated as shown in the preview screen 418. The cut quantity 408 value entered is 500 and this information is combined with the Number up 420 value of 2 images per page to automatically calculate the quantity 410 value of 250 pages.

While specific embodiments of the present disclosure have been illustrated and described, it will be understood by those having ordinary skill in the art that changes can be made to those embodiments without departing from the spirit and scope of the disclosure.

What we claim is:

1. A method of providing a N-up calculator graphical user interface, the method comprising the step of:
    setting a first value that specifies a number of individual images to be duplicated as an output image on a page;
    setting a second value that specifies the page size for the output image;
    setting a third value that specifies a dimension of the output image;
    selecting, by a user, a print mode from a plurality of user selectable print modes;
    determining, based on a set of rules, which of the first, second, or third values are held constant and which are automatically computed when the setting of any one of the first value, the second value, or the third value affects the other of the first value, the second value, or the third value; and
    printing the output image according to the determined first, second and third values,
    wherein said set of rules is determined based on said user selected print mode.

2. The method according to claim 1, further comprising providing a feedback screen that provides a visual representation of how changes to any one of the values affects the number of individual images, orientation of individual images, and arrangement of individual images that will be duplicated on a page.

3. The method according to claim 1, where in the dimension is height.

4. The method according to claim 1, wherein the dimension is width.

5. The method according to claim 1, further comprising setting a fourth value that specifies a degree of magnification or reduction, wherein the selection of the degree of magnification or reduction automatically calculates the third value to provide the output image in accordance with the degree of magnification or reduction.

6. The method according to claim 1, wherein the method is performed on a printing apparatus and the printing apparatus is one of: a photocopier, a xerographic photocopier, a paper handler, a document finisher, a scanner, a printer, or a fax machine.

7. The method according to claim 5, further comprising setting a fifth value that specifies the total number of individual images that are to be duplicated.

8. The method according to claim 1, wherein a means to alter the set of rules determine which values are held constant and which are automatically computed with the setting of any one of the other values.

9. A computer program product for providing a N-up calculator graphical user interface comprising:
    a non-transitory computer readable medium; and
    computer program instructions, recorded on the computer readable medium, executable by a processor, for performing the steps of:
    setting a first value that specifies a number of individual images to be duplicated as an output image on a page;
    setting a second value that specifies the page size for the output image;
    setting a third value that specifies a dimension of the output image;
    displaying a plurality of user selectable print modes to a user for a print mode selection;
    determining, based on a set of rules, which of the first, second, or third values are held constant and which are automatically computed when the setting of any one of the first value, the second value, or the third value affects the other of the first value, the second value, or the third value; and
    printing the output image according to the determined first, second and third values,
    wherein said set of rules is determined based on said user selected print mode.

10. The computer program product according to claim 9, further comprising computer program instructions for performing the step of setting a feedback screen that provides a visual representation of how changes to any one of the values affects the number of individual images and layout of those individual images that will be duplicated on a page.

11. The computer program product according to claim 9, where in the dimension is height.

12. The computer program product according to claim 9, wherein the dimension is width.

13. The computer program product according to claim 9, further comprising computer program instructions for performing the step of setting a fourth value that specifies a degree of magnification or reduction, wherein the selection of the degree of magnification or reduction automatically calculates the third value to provide the output image in accordance with the degree of magnification or reduction.

14. The computer program product according to claim 9, wherein the computer program product is included in a printing apparatus and the printing apparatus is one of: a photocopier, a xerographic photocopier, a paper handler, a document finisher, a scanner, a printer, or a fax machine.

15. The computer program product according to claim 13, further comprising computer program instructions for performing the step of setting a fifth value that specifies the total number of individual images that are to be duplicated.

16. The computer program product according to claim 9, wherein a means to alter the set of rules determine which values are held constant and which are automatically computed with the setting of any one of the other values.

17. An apparatus comprising:
a processor executing computer program instructions; and
a memory storing computer program instructions executable by the processor,
wherein said computer program instructions cause the processor to perform the steps of:
setting a first value that specifies a number of individual images to be duplicated as an output image on a page;
setting a second value that specifies the page size for the output image;
setting a third value that specifies a dimension of the output image;
displaying a plurality of user selectable print modes to a user for a print mode selection;
determining, based on a set of rules, which of the first, second, or third values are held constant and which are automatically computed when the setting of any one of the first value, the second value, or the third value affects the other of the first value, the second value, or the third value; and
printing the output image according to the determined first, second and third values,
wherein said set of rules is determined based on said user selected print mode.

18. The apparatus according to claim 17, wherein the processor executes computer program instructions for performing the step of providing a feedback screen operable to provide a visual representation of how changes to any one of the values affects the number of individual images, orientation of individual images, and arrangement of individual images that will be duplicated on a page.

19. The apparatus according to claim 17, where in the dimension is height.

20. The apparatus according to claim 17, wherein the dimension is width.

21. The apparatus according to claim 17, wherein the processor executes computer program instructions for performing the step of setting a fourth value that specifies a degree of magnification or reduction, wherein the selection of the degree of magnification or reduction automatically calculates the third value to provide the output image in accordance with the degree of magnification or reduction.

22. The apparatus according to claim 17, wherein the apparatus is one of a printing apparatus and the printing apparatus is one of: a photocopier, a xerographic photocopier, a paper handler, a document finisher, a scanner, a printer, or a fax machine.

23. The apparatus according to claim 21, further comprising the processor executes computer program instructions for performing the step of setting a fifth value that specifies the total number of individual images that are to be duplicated.

24. The apparatus according to claim 17, further comprising:
means to alter the set of rules that determine which values are held constant and which are automatically computed with the setting of any one of the other values.

\* \* \* \* \*